United States Patent [19]

Takahashi

[11] Patent Number: 5,238,171
[45] Date of Patent: Aug. 24, 1993

[54] BRAZING METHOD BY CONTINUOUS FURNACE

[75] Inventor: Susumu Takahashi, Yokohama, Japan

[73] Assignee: Kanto Yakin Kogyo K.K., Japan

[21] Appl. No.: 878,442

[22] Filed: May 4, 1992

[30] Foreign Application Priority Data

May 13, 1991 [JP] Japan .................................. 3-202615

[51] Int. Cl.⁵ ............................................. B23K 1/008
[52] U.S. Cl. ................................... 228/102; 228/105; 228/232; 228/9
[58] Field of Search ............... 228/102, 103, 105, 232, 228/239, 8, 9

[56] References Cited

U.S. PATENT DOCUMENTS

| | | | |
|---|---|---|---|
| 4,180,199 | 12/1979 | O'Rourke et al. | 228/102 |
| 4,446,358 | 5/1984 | Comerford et al. | 228/232 |

FOREIGN PATENT DOCUMENTS

| | | | |
|---|---|---|---|
| 0402832 | 12/1990 | European Pat. Off. | 228/102 |
| 58-128285 | 7/1983 | Japan | 228/102 |
| 61-222674 | 10/1986 | Japan | 228/102 |
| 63-72477 | 4/1988 | Japan | 228/9 |
| 2-263569 | 10/1990 | Japan | 228/9 |

*Primary Examiner*—Samuel M. Heinrich
*Attorney, Agent, or Firm*—Shlesinger, Fitzsimmons & Shlesinger

[57] ABSTRACT

In order to have metallic articles to be brazed preheated evenly as a whole before transferring them into a brazing chamber of a continuous furnace where a high brazing temperature is created, a difference of temperatures of parts of the articles during their preheating is remotely sensed by means of their infrared energies and is minimized as small as possible by changing a transfer speed of the articles during their preheating with reference to the information based upon the infrared energies then sensed. A brazing period of time in the brazing chamber is kept constant and short, irrespectively of the transfer speed of the articles.

4 Claims, 2 Drawing Sheets

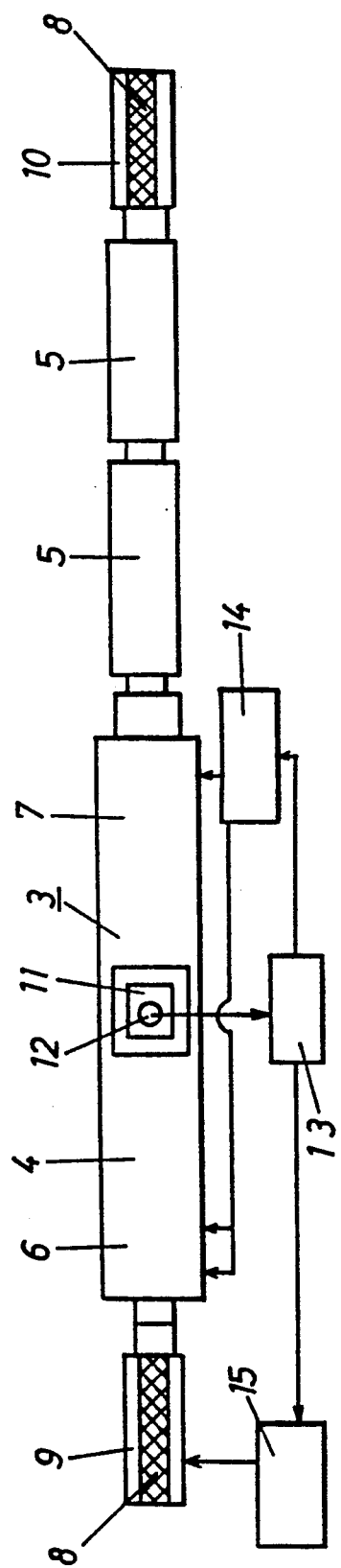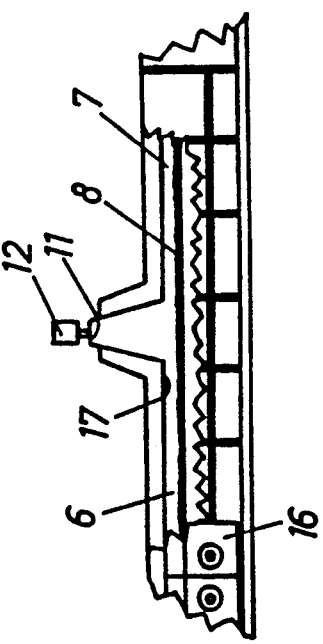

BRAZING METHOD BY CONTINUOUS FURNACE

BACKGROUND OF THE INVENTION

Brazing methods performed by a continuous furnace have been well known. Typically a plurality of metallic parts to be brazed together are brought in abutment with a metallic solder having a melting point lower than the metallic parts and deposited between portions of the metallic parts to be joined, and they are passed through the continuous furnace so that the metallic parts are not melted but the metallic solder is melted whereby the spaces between the portions are filled up with the solder thus melted and moved by a capillary action into such spaces, and then the metallic parts with the solder are cooled.

In such brazing methods, it is generally not preferable to have the metallic parts subjected for a long period of time to such high temperature at which the metallic solder melts. In other words, it is desirable to subject them under such high temperature for as short a time as possible.

For example, when steel parts are brazed by a copper solder, the solder would excessively penetrate into iron crystalline spaces of the steel parts or produce weak alloys with iron elements, resulting in making the mechanical strength of joint portions low, if the brazing at a higher temperature is continued for a long period of time and the solder is accordingly kept liquid for the long period of time.

Also in case of brazing aluminum alloy parts which are joined generally by means of a solder made of Al-Si alloys, said solder would make the aluminum portion of the aluminum alloy parts eutectic and decompose aluminum alloy structures of the parts, if the solder is melted and kept liquid for a long period of time.

Such drawbacks as mentioned above could be avoided if temperatures of metallic parts to be brazed are raised evenly as a whole, for example by inserting all of the parts at one time in a batch-type furnace, and they are kept at a brazing high temperature only for a minimum period of time. However, this way of heating the parts in continuous brazing furnaces is very difficult, because, they have not the same dimensional volume as batch-type furnaces, and their thermal characteristics are different.

For example as shown in FIG. 1, when an aluminum part 1 having a thickness of 5 mm and another aluminum part 2 having a thickness of 1 mm are heated together in a furnace, the thin plate 1 reaches first, as a natural consequence, a high temperature, while the thick plate 2 reaches belatedly said high temperature.

This means that if a heating curve is selected so as to be proper for heating the thin part 1, a brazing solder on the thick portion 2 will not be melted during the time T shown in FIG. 1, because the thick portion 2 will not have been heated to the desired brazing temperature until near the end of the time interval T. And, on the contrary, if the heating curve is selected so as to be suitable for heating the thick part, the thin part will overheated adversely affecting its physical properties.

In other words, if during preheating the parts exhibit a difference of temperatures which is represented by d in FIG. 1, it is necessary to have them subjected to a high brazing temperature for a comparatively long period of time expressed by T in FIG. 1 in order to make sure that the part 2 will reach the brazing temperature necessary for melting the brazing solder.

BRIEF SUMMARY OF THE INVENTION

Therefore, it is an object of this invention to preheat an article consisted of a plurality of parts to a high temperature evenly as a whole, and consequently to minimize subjecting the article to a high brazing temperature.

In order to achieve this object, the preheating of the article in a continuous furnace is controlled so as to have a heat-pattern such as shown in FIG. 2.

In more particularity, infrared energies of each component part of an article during preheating are remotely sensed by an infrared camera or a radioactive meter, and resultant data are continuously analyzed. When there is found a large difference of temperature d between a temperature curve 1' for a thin part and another curve 2' for a thick part, the speed of travel of the article within the continuous furnace for preheating it is made slow to enable temperature of the thick part come level with a temperature of thin part so that said difference of temperature becomes as minimum as possible as shown by d' before having the article subjected to the desired or predetermined brazing temperature in FIG. 2. Thus, when the article is preheated so that its temperature is raised evenly as a whole, a time required to subject it to a high brazing temperature becomes short as indicated in FIG. 2 by T'.

It is a matter of fact that when it is found that a temperature distribution of the preheated article is not so much uneven, it can be transferred fast through a preheating chamber.

When the speed of the conveyor belt circulating through a conventional continuous furnace is made slow in order to compensate or normalize a difference of temperatures of the parts, a period of time for which the article is subjected to a high brazing temperature in a brazing chamber becomes longer too. This is against the object of this invention. Therefore, it is preferable to divide the brazing chamber to several heater sections. When the conveyor belt is moved comparatively slowly, only some of said heater sections will be worked or energized. And, on the contrary, when the belt moves fast, many or all of them will be worked.

For this purpose, the conveyor belt, as an alternate, may be divided to one circulating in the preheating chamber and another circulating in the brazing chamber, so that they can be moved independently to each other at a speed suitable to said purpose.

BRIEF DESCRIPTION OF THE DRAWING

FIG. 3 is an explanatory plan view of a preferable continuous furnace for paracticing this invention, and FIG. 4 is a explanatory and sectional view of a part of the furnace shown in FIG. 3.

DETAILED DESCRIPTION OF EXAMPLE

Figure 1:
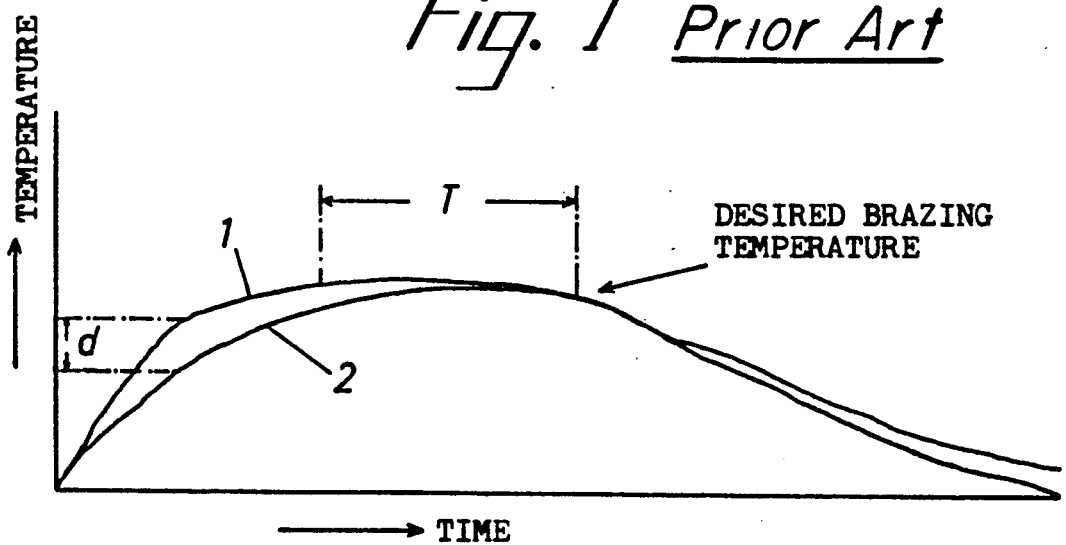
FIG. 1 shows a conventional temperature pattern of an article when heated for brazing in a continuous furnace.

A continuous furnace 3 shown in FIG. 3 has a heating chamber 4 and a cooling chamber 5. The heating chamber comprises a preheating zone 6 and a brazing zone 7. A conveyor belt 8 which circulates in the furnace is variable at its speed by a driving device 9 and a driven device 10. As shown in FIGS. 3 and 4, particularly FIG. 4, the numeral 11 represents a heatproof glass window which is provided to a part of metallic muffle 17 of the heating chamber 4 and which is thermally and hermetically insulated from walls of the furnace so that it will not harm hermetic and heating features of the muffle. To the window, there is provided an infrared camera 12 to sense remotely through the window infrared energies of an article transferred through the continuous furnace 3 by the conveyor belt 8. The infrared camera may be replaced by a radioactive meter.

Numeral 13 indicates a device for analyzing thermal images of the article caught by the infrared camera 12. Output signals or data taken out from the device 13 is sent to a speed-contorol panel 15.

Figure 2:
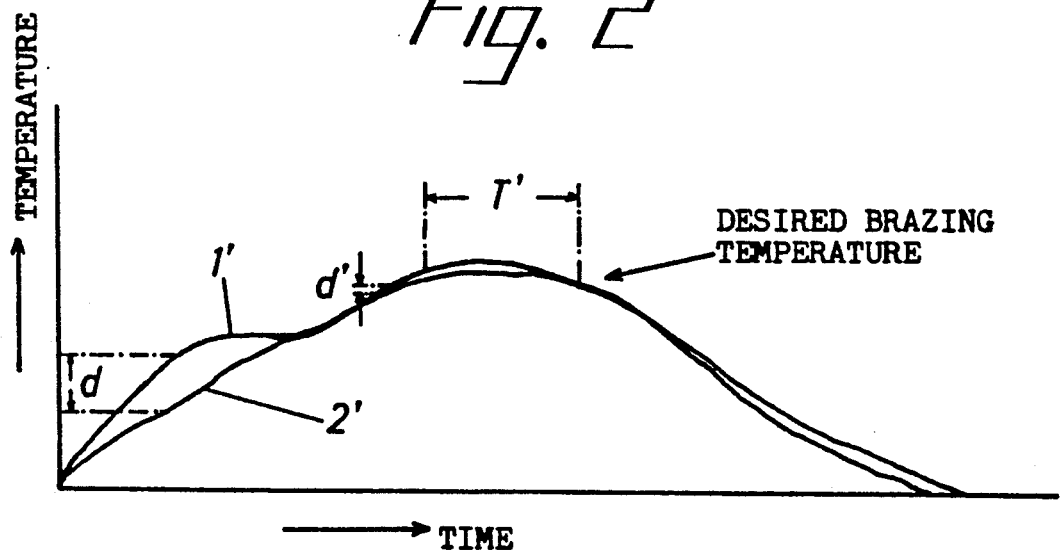
FIG. 2 shows a graph to show how the article is elevated of its temperature in accordance with this invention.

The heat-control panel 14 works to control, by the signals sent thereto, heaters (not shown) for the preheating zone 6 and the brazing zone 7 of the heating chamber 4, while the speed-control panel 15 controls likewise the speed of the driving device 9, so that by controlling both the conveyor speed and the heaters, they cause the article have a temperature pattern of FIG. 2 when it is preheated and heated for brazing.

With the continuous furnace having the above-mentioned structures, tests included an article consisted of steel parts which were brazed with a copper solder, and another article made from aluminum (3003 aluminum) parts which were brazed by means of a solder of Al-Si alloy.

The articles brazed in accordance with this invention had a shape of U turned sideways. The upper lateral part of the steel article was a steel sheet of 1 mm thickness, and the lower lateral part was a steel sheet of 5 mm thickness. They were joined by a vertical steel sheet of 1 mm thickness.

First, the above mentioned three steel parts were brazed by a copper solder having a melting point of 1,083° C. The three sheets, which were provisionally assembled in the desired U shape of the article, and which were provided with the solder between the portions to be brazed were passed through the preheating zone and the brazing zone for brazing them at a predetermined brazing temperature of 1,100° C., and subsequently were transferred to the cooling chamber. The mean temperatures of the upper thin sheet and the vertical thin sheet at the end of the preheating zone, before attaining the desired brazing temperature of 1,100° C., were 1,050° C. when observed by the infrared camera 12 and the analyzing device 13. The mean temperature of the lower thick sheet was also observed and calculated by the infrared camera and the analyzing device to determined the difference of temperatures between the upper and vertical thin sheets and the lower thick sheet. In order to know how a speed of the conveyor belt can be used to minimize said difference of temperatures, the speed was changed during preheating to various values by the driving device 15, while it was controlled to have the article, subjected to the desired brazing temperature for only 3 minutes for each test. In other words, the speed of conyeyor belt was changed from 5 cm/minute to 80 cm/minute during preheating, and after such preheating, the article was heated at 1,100° C. always for 3 minutes for brazing by controlling an effective heating length of the brazing zone in accordance with the speed of the belt then prevailing with reference to the signals from the device 13.

The results were shown in the following table 1.

TABLE 1

(Brazing of steel article by copper solder)

| Transfer speed of belt | Temperature | | | Time for keeping at a desire brazing temperature (1,100° C.) | Brazing results |
|---|---|---|---|---|---|
| | High temperature parts (upper & vertical sheets) | Low temperature parts (lower sheets) | Difference of temperature | | |
| 5 cm/minutes | 1,050° C. | 1,048° C. | 2° C. | 3 minutes | good |
| 10 cm/minutes | 1,050° C. | 1,042° C. | 8° C. | 3 minutes | good |
| 20 cm/minutes | 1,050° C. | 1,033° C. | 17° C. | 3 minutes | good |
| 40 cm/minutes | 1,050° C. | 1,011° C. | 39° C. | 3 minutes | no good |
| 80 cm/minutes | 1,050° C. | 984° C. | 66° C. | 3 minutes | no good |

As shown in Table 1, good brazing results were obtained if the difference of temperatures d' of the parts were within about 20° C. at the time when the upper and vertical thin sheets were preheated to 1,050° C. before they attained the desired brazing temperature of 1,100° C.

Therefore, good brazing can be achieved by sensing, through infrared engergies, a temperature distribution of component parts of an article to be brazed and by controlling a speed of a conveyor belt by means of the speed control panel 15 to which signals thus sensed are input so that each component part will be preheated within a difference of temperature within 20° C. compared to a reference temperature of 1,050° C. for example. The signals are also sent to the temperature control panel 14 for selectively controlling heater sections to produce an effective heating length in the brazing zone so that the article is kept at the brazing temperature only for a predetermined short period of time.

The brazing was made also for the article of same structures but made of 3003 aluminum.

Results are shown in the following Table 2.

TABLE 2

(Brazing of aluminum article by Al—Si alloy solder)

| Transfer speed of belt | Temperature | | | Time for keeping at a desire brazing temperature (1,100° C.) | Brazing results |
|---|---|---|---|---|---|
| | High temperature parts (upper & vertical sheets) | Low temperature parts (lower sheets) | Difference of temperature | | |
| 5 cm/minutes | 520° C. | 518° C. | 2° C. | 5 minutes | good |
| 10 cm/minutes | 520° C. | 516° C. | 4° C. | 5 minutes | good |
| 20 cm/minutes | 520° C. | 512° C. | 8° C. | 5 minutes | good |
| 40 cm/minutes | 520° C. | 497° C. | 23° C. | 5 minutes | no good |

TABLE 2-continued (Brazing of aluminum article by Al—Si alloy solder)

| Transfer speed of belt | Temperature | | | Time for keeping at a desire brazing temperature (1,100° C.) | Brazing results |
| --- | --- | --- | --- | --- | --- |
| | High temperature parts (upper & vertical sheets) | Low temperature parts (lower sheets) | Difference of temperature | | |
| 80 cm/minutes | 516° C. | 473° C. | 47° C. | 5 minutes | no good |

As shown in Table 2, when the difference of temperature at a reference temperature of 520° C. between the upper and vertical thin sheets and the lower thick sheet was below 8° C., good brazing results were obtained. It is a matter of course that so far as good brazing is obtainable, the speed shall be faster in view of more economic production.

In this invention, temperature distributions of each of the component parts of an article to be brazed are sensed by means of their infrared energies at a reference temperature before they are heated to a desired brazing temperature. The information thus obtained is utilized to change a speed of a conveyor belt so as to minimize, in advance of subjecting the article to a high brazing temperature, a difference of temperatures induced from the above temperature distributions. Since the article is heated evenly as a whole, it is good enough to have the article subjected to said high brazing temperature only for a minimum period of time in a novel manner made in accordance with this invention.

I claim:

1. In a brazing method performed by a continuous furnace in which each of the metallic articles to be brazed comprises a plurality of metal parts having a solder and flux interposed therebetween, and wherein said articles are continuously passed by a single conveyor through elongated tunnel-like furnace chambers, preheated in a preheating chamber to a preheating temperature which is below a brazing temperature at which the solder and flux become liquid, subsequently heated to the brazing temprature in a brazing chamber having a plurality of heater sections and then cooled, the improvement characterized by determining the difference in temperatures of the respective parts of each article in the preheating chamber by remotely sensing their infrared energies, controlling the transfer speed of the articles during the preheating by adjusting the speed of said conveyor with reference to said difference of temperatures among said parts, and controlling the period of time for which the articles are subjected to the brazing temperature in said brazing chamber by selectively energizing the heater sections thereof with reference to the transfer speed at which the articles have been preheated.

2. The brazing method as claimed in claim 1 in which the period of time for which the articles are subjected to the brazing temperature is controlled by having the articles pass at a variably controlled speed through said brazing chamber in which the brazing temperature is created.

3. The brazing method as claimed in claim 1 or 2, including sensing the infrared energies of the articles through a window made of anti-thermal glass which is hermetically and heat insulatingly provided between said preheating and brazing chambers.

4. The brazing method as claimed in claim 3, including using an infrared camera or radioactive meter to detect infrared energies of the articles through the window.

* * * * *